(12) United States Patent
Nakata et al.

(10) Patent No.: US 6,887,534 B2
(45) Date of Patent: May 3, 2005

(54) LIQUID CRYSTAL ALIGNING AGENT, METHOD OF FORMING A LIQUID CRYSTAL ALIGNMENT FILM AND LIQUID CRYSTAL DISPLAY ELEMENT

(75) Inventors: Shoichi Nakata, Tokyo (JP); Masayuki Kimura, Tokyo (JP)

(73) Assignee: JSR Corporation, Tokyo (JP)

( * ) Notice: Subject to any disclaimer, the term of this patent is extended or adjusted under 35 U.S.C. 154(b) by 1 day.

(21) Appl. No.: 10/367,893

(22) Filed: Feb. 19, 2003

(65) Prior Publication Data

US 2004/0009310 A1 Jan. 15, 2004

(30) Foreign Application Priority Data

Feb. 18, 2002 (JP) ........................................ 2002-040404
Dec. 24, 2002 (JP) ........................................ 2002-371612

(51) Int. Cl.$^7$ ............................................. C09K 19/00
(52) U.S. Cl. ........................................ 428/1.2; 528/353
(58) Field of Search ............................... 428/1.1–1.31; 528/332, 353

(56) References Cited

U.S. PATENT DOCUMENTS

| | | | |
|---|---|---|---|
| 4,345,249 A | | 8/1982 | Togashi |
| 5,539,074 A | | 7/1996 | Herr et al. |
| 5,602,661 A | | 2/1997 | Schadt et al. |
| 5,773,559 A | * | 6/1998 | Miyamoto et al. ......... 528/353 |
| 5,969,055 A | | 10/1999 | Nishikawa et al. |
| 6,001,277 A | * | 12/1999 | Ichimura et al. ......... 252/299.4 |
| 6,043,337 A | * | 3/2000 | Gibbons et al. ............ 528/353 |
| 6,048,928 A | | 4/2000 | Yu et al. |
| 6,224,788 B1 | | 5/2001 | Ogawa et al. |
| 6,312,769 B1 | | 11/2001 | Hiraoka et al. |
| 6,552,161 B1 | * | 4/2003 | Gibbons et al. ............ 528/353 |

FOREIGN PATENT DOCUMENTS

| | | | | |
|---|---|---|---|---|
| JP | 56-91277 | | 7/1981 | |
| JP | 63-291922 | | 11/1988 | |
| JP | 1-120528 | | 5/1989 | |
| JP | 6-287453 | | 10/1994 | |
| JP | 6-289374 | | 10/1994 | |
| JP | 7-305065 | * | 11/1995 | ........... C09K/19/56 |
| JP | 10-251646 | | 9/1998 | |
| JP | 11-2815 | | 1/1999 | |
| JP | 11-152475 | | 6/1999 | |
| JP | 2000-144136 | | 5/2000 | |
| JP | 2000-281724 | | 10/2000 | |
| JP | 2000-319510 | | 11/2000 | |

OTHER PUBLICATIONS

Abstract for Japanese Patent to Miyamoto.*

* cited by examiner

*Primary Examiner*—Mark F. Huff
*Assistant Examiner*—Jennifer R. Sadula
(74) *Attorney, Agent, or Firm*—Oblon, Spivak, McClelland, Maier & Neustadt, P.C.

(57) ABSTRACT

A liquid crystal aligning agent which can provide liquid crystal aligning capability through exposure to polarized radiation without rubbing and which is used to form a liquid crystal alignment film, a method of forming a liquid crystal alignment film, and a liquid crystal display element having this liquid crystal alignment film. An alignment film is formed from a liquid crystal aligning agent containing a polymer having a polyamic acid ester structure with a conjugated enone structure in the side chain and applying radiation to it from a predetermined direction. Thereby, a liquid crystal display element having high thermal stability in the alignment of liquid crystals and excellent display characteristics can be manufactured.

14 Claims, 1 Drawing Sheet

LIQUID CRYSTAL ALIGNING AGENT, METHOD OF FORMING A LIQUID CRYSTAL ALIGNMENT FILM AND LIQUID CRYSTAL DISPLAY ELEMENT

FIELD OF THE INVENTION

The present invention relates to a liquid crystal aligning agent, a method of forming a liquid crystal alignment film, and a liquid crystal display element. More specifically, it relates to a method of forming a liquid crystal alignment film, which can provide liquid crystal aligning capability through exposure to polarized radiation without rubbing, a liquid crystal aligning agent used in the method, and a liquid crystal display element having this liquid crystal alignment film.

DESCRIPTION OF THE PRIOR ART

Heretofore, there have been known liquid crystal display elements having a TN (Twisted Nematic) or STN (Super Twisted Nematic) liquid crystal cell manufactured by sandwiching nematic liquid crystals having positive dielectric anisotropy between substrates having a transparent electrode and a liquid crystal alignment film to continuously twist the long axes of liquid crystal molecules at 90° or more between the substrates.

As one of the modes for improving the visual characteristics of the above liquid crystal display elements having a TN or STN liquid crystal cell, an electric field is applied to the liquid crystals in a direction parallel to the plane of each of the substrates (IPS (In Plane Switching) mode). As IPS mode, there is proposed a method employing a pair of comblike electrodes (JP-A 56-91277 and JP-A 1-120528) (the term "JP-A" as used herein means an "unexamined published Japanese patent application").

As means of aligning liquid crystals in such a liquid crystal cell, there are a method in which an organic film is formed on the surface of a substrate and the surface of the organic film is rubbed with cloth such as rayon cloth in one direction to provide liquid crystal aligning capability (rubbing), a method in which silicon oxide is deposited obliquely on the surface of a substrate, and a method in which a monomolecular film having a long-chain alkyl group is formed by a Langmuir-Blodgett's technique (LB technique). Out of these, the alignment of liquid crystals by rubbing is generally employed from the viewpoints of substrate size, uniformity in the alignment of liquid crystals, processing time and processing cost.

However, when liquid crystals are aligned by rubbing, dust is produced or static electricity is readily generated during this step, whereby dust is adhered to the surface of an alignment film, causing a display failure. In the case of a substrate having a TFT (thin film transistor) element, generated static electricity causes the circuit destruction of the TFT element, thereby reducing the yield. Further, liquid crystal display elements which will be manufactured based on a finer pattern rule in the future have a problem such as rubbing nonuniformity due to the uneven surface of the substrate caused by an increase in the density of pixels.

In the case of a liquid crystal display element having a pair of comblike electrodes, as a liquid crystal alignment film is formed on the electrodes, the surface of the liquid crystal alignment film is affected by the unevenness of the comb-like electrodes, and the surface of the film is scratched, thereby deteriorating visual characteristics and display characteristics.

Another means of aligning liquid crystals in the liquid crystal cell is to provide liquid crystal aligning capability by exposing a photosensitive polymer film of polyvinyl cinnamate or poly(4'-methacryloyloxychalcon) formed on the surface of a substrate to linearly polarized ultraviolet light (photo-alignment method). With this method, uniform alignment of liquid crystals can be realized without generating static electricity or dust (JP-A 6-289374, JP-A 6-287453, JP-A 10-251646, JP-A11-2815, JP-A 11-152475, JP-A 2000-144136. JP-A 2000-319510 and JP-A 2000-281724).

However, the above photosensitive polymer alignment film has low thermal stability. For example, when a polyvinyl cinnamate film is used in the photo-alignment method, it has been found experimentally that liquid crystal aligning capability becomes unstable at a temperature of 100° C. or more. A heat resistance of 100° C. or more is required in the step of treating the liquid crystal cells above the isotropic temperature after the filling of the liquid crystals or the step of thermally curing an adhesive for assembling together the substrates in the production process of a liquid crystal display element.

There is also known a vertical (homeotropic) alignment mode in which liquid crystal molecules having negative dielectric anisotropy are aligned perpendicularly to substrates as another one of the operation modes of a liquid crystal displayelement. In this operation mode, when liquid crystal molecules are tilted toward a direction parallel to the substrates by applying voltage between the substrates, they must be tilted toward one direction within the plane of each of the substrates from the normal direction of the substrate. Therefore, there is proposed a method in which liquid crystal molecules are slightly tilted from the normal direction of the substrate toward one direction within the plane of the substrate while no voltage is applied. Thereby, the tilting direction of the liquid crystal molecules when voltage is applied can be determined.

However, even when the tilting direction of the liquid crystal molecules is controlled by these methods, an alignment disturbance readily occurs by the influence of a horizontal electric field produced between pixels because azimuthal anchoring force for the liquid crystal molecules is insufficient. Azimuthal anchoring force for the liquid crystal molecules can be improved by increasing the tilt angle of the liquid crystal molecules from the normal direction of the substrate. However, when the above tilt angle of the liquid crystal molecules is 5° or more from the normal direction of the substrate, light transmission increases while no voltage is applied, resulting in reduced contrast.

In recent years, as new operation modes of a liquid crystal display element, there are proposed an OCB mode in which nematic liquid crystals having positive dielectric anisotropy are sandwiched between substrates having a homogeneous alignment film with a large tilt angle and a transparent electrode and aligned in a bend alignment manner and an R-OCB mode in which liquid crystals are sandwiched between a substrate having a homogeneous alignment film and a transparent electrode and a substrate having a homeotropic. alignment film and a transparent electrode and aligned in a bend alignment manner. Since uniform alignment is effected in these operation modes, a pretilt angle of 10 to 20° is required for the homogeneous alignment film. However, it has been difficult to provide such a large pretilt angle to a liquid crystal alignment film formed by a rubbing or photo-alignment method stably.

SUMMARY OF THE INVENTION

It is a first object of the present invention to provide a liquid crystal aligning agent which can provide liquid crystal aligning capability through exposure to linearly polarized or partially polarized radiation without rubbing and is used to form a liquid crystal alignment film.

It is a second object of the present invention to provide a liquid crystal aligning agent used to form a liquid crystal alignment film having excellent thermal stability.

It is a third object of the present invention to provide a liquid crystal aligning agent which can provide azimuthal anchoring force to a liquid crystal alignment film formed on the surface of a substrate through exposure to linearly polarized or partially polarized radiation when voltage is applied and is capable of forming a homeotropic alignment film.

It is a fourth object of the present invention to provide a liquid crystal aligning agent which can provide azimuthal anchoring force when voltage is applied without requiring a pretilt angle while no voltage is applied and is capable of forming a homeotropic alignment film.

It is a fifth object of the present invention to provide a liquid crystal aligning agent capable of obtaining a liquid crystal alignment film which can exhibit a pretilt angle of 10° or more.

It is a seventh object of the present invention to provide a liquid crystal aligning agent capable of obtaining a liquid crystal display element of a transverse electric field mode having excellent visual characteristics and display characteristics by using a liquid crystal aligning method for providing strong anchoring force to a liquid crystal alignment film without contact.

It is an eighth object of the present invention to provide a method of forming a liquid crystal alignment film from the liquid crystal aligning agent of the present invention.

It is a ninth object of the present invention to provide a liquid crystal display element having the above liquid crystal alignment film.

Other objects and advantages of the present invention will become apparent from the following description.

According to the present invention, firstly, the above objects and advantages of the present invention can be attained by a liquid crystal aligning agent which contains a polymer having a structure represented by the following formula (I):

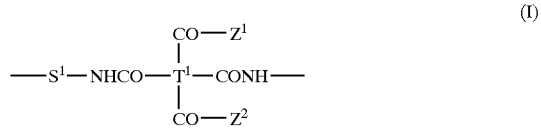

(I)

wherein $S^1$ is a divalent organic group, $T^1$ is a tetravalent organic group, and $Z^1$ and $Z^2$ are each independently a hydroxyl group or monovalent organic group, with the proviso that at least one of $Z^1$ and $Z^2$ is at least one specific group selected from the group consisting of a monovalent organic group represented by the following formula (II):

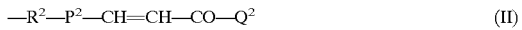

(II)

wherein $Q^2$ is a monovalent organic group having an aromatic ring, $P^2$ is a divalent organic group having an aromatic ring, and $R^2$ is a divalent bonding group,
and a monovalent organic group represented by the following formula (III):

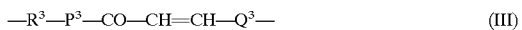

(III)

wherein $Q^3$ is a monovalent organic group having an aromatic ring, $P^3$ is a divalent organic group having an aromatic ring, and $R^3$ is a divalent bonding group.

According to the present invention, secondly, the above objects and advantages of the present invention are attained by a method of forming a liquid crystal alignment film, comprising the steps of applying the liquid crystal aligning agent of the present invention to a substrate and exposing the coating film to linearly polarized or partially polarized radiation or nonpolarized radiation.

According to the present invention, thirdly, the above objects and advantages of the present invention are attained by a liquid crystal display element having a liquid crystal alignment film obtained by the above formation method.

DETAILED DESCRIPTION OF THE PREFERRED EMBODIMENT

Liquid Crystal Aligning Agent

Figure 1:
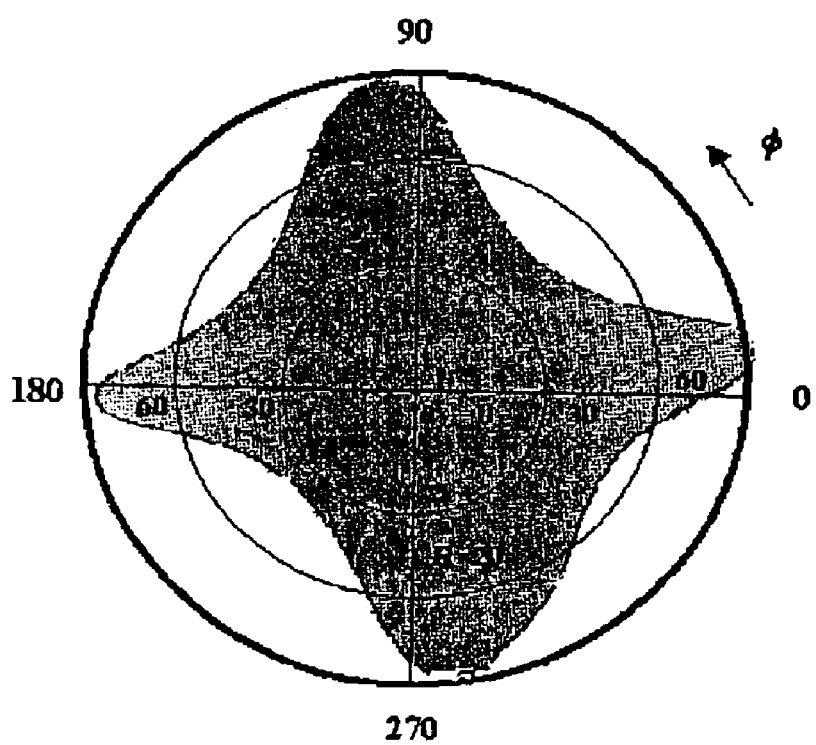
FIG. 1 is an evaluation diagram showing the visual characteristics of a liquid crystal display element obtained by the present invention.

The liquid crystal aligning agent of the present invention contains a polymer having a structure sensitive to radiation (may also be referred to as "specific polymer" hereinafter). The word "sensitive" as used herein means that, by the application of radiation, an electron absorbs the energy of light to be excited, thereby producing or dissociating a bond to return to its ground state. The structure sensitive to radiation is a group having a conjugated enone structure represented by the above formula (II) or (III) (may also be referred to as "specific groups" hereinafter). $P^2$ and $P^3$ in the above formulas (II) and (III) are each a divalent organic group having an aromatic ring, and $Q^2$ and $Q^3$ are each a monovalent organic group having an aromatic ring. $P^2$, $P^3$, $Q^2$ and $Q^3$ are each preferably an organic group having 6 to 20 carbon atoms which may be substituted by a halogen atom.

Examples of the monovalent organic group having an aromatic ring ($Q^2$, $Q^3$) include phenyl group, 4-methoxyphenyl group, 4-pentylphenyl group, 4-octylphenyl group, 4-fluorophenyl group, 3-methoxyphenyl group, 3-pentylphenyl group, 3-octylphenyl group, 3-fluorophenyl group, 3,4-difluorophenyl group, 3,4,5-trifluorophenyl group, 4-trifluoromethylphenyl group, 3-trifluoromethylphenyl group, biphenyl group, 4-pentylbiphenyl group, 4-octylbiphenyl group, 4-fluorobiphenyl group, 3,4-difluorobiphenyl group, 3,4,5-trifluorobiphenyl group, 1-naphthyl group, 4-octyl-1-naphthyl group, 5-pentyl-1-naphthyl group, 2-naphthyl group, 6-octyl-2-naphthyl group, 9-anthracenyl group, 9-anthracenyl group and 10-pentyl-9-anthracenyl group.

Examples of the divalent organic group having an aromatic ring ($P^2$, $P^3$) include 1,2-phenylene group, 3-fluoro-1,2-phenylene group, 4-fluoro-1,2-phenylene group, 3-methoxy-1,2-phenylene group, 4-methoxy-1,2-phenylene group, 3-methyl-1,2-phenylene group, 4-methyl-1,2-phenylene group, 1,3-phenylene group, 2-fluoro-1,3-phenylene group, 4-fluoro-1,3-phenylene group, 5-fluoro-1,3-phenylene group, 2-methoxy-1,3-phenylene group, 4-methoxy-1,3-phenylene group, 5-methoxy-1,3-phenylene group, 2-methyl-1,3-phenylene group, 4-methyl-1,3-phenylene group. 5-methyl-1,3-phenylene group, 1,4-phenylene group, 2-fluoro-1,4-phenylene group, 2-methoxy-1,4-phenylene group, 2-methyl-1,4-phenylene group, 4,4'-biphenylene group, 3,4'-biphenylene group and 3,3'-biphenylene group.

$R^2$ and $R^3$ in the above formulas (II) and (III) are each a divalent bonded group, preferably an organic group having 6 to 24 carbon atoms and an oxygen atom. The organic group having 6 to 24 carbon atoms and an oxygen atom preferably contains a linear alkyl chain consisting of 6 or more methylene groups. Examples of the above bonded group include alkylenedioxy groups such as 1,6-hexamethylenedioxy group, 1,8-octamethylenedioxy group and 1,10-decamethylenedioxy group; bis(2-oxyethyl)ether group, (1-oxypropylene)-(2-oxypropylene)ether group, 1-(2-(1-oxypropylene)oxy)-2-(1-(2-oxypropylene)oxy) propylene group and 1,2-bis(2-oxyethoxy)ethyl group; and —O—$C_5H_{10}$—COO—, and —O—$C_6H_{12}$—COO—.

The polymer constituting the liquid crystal aligning agent of the present invention is a specific polymer having a structure represented by the above formula (I). In the above formula (I), $S^1$ is a divalent organic group, and $T^1$ is a tetravalent organic group. $S^1$ and $T^1$ are preferably an organic group having 6 to 40 carbon atoms. In the above formula (I), $Z^1$ and $Z^2$ are each independently a hydroxyl group or a monovalent organic group, and at least one of them is at least one specific group selected from the group consisting of a monovalent group represented by the above formula (II) and a monovalent group represented by the above formula (III). Examples of $Z^1$ and $Z^2$ include hydroxyl group; alkoxyl groups such as methoxy group, ethoxy group, propoxy group, cetyloxy group and stearyloxy group; and fluoroalkoxyl groups such as 2,2,2-trifluoromethoxygroup, besides the groups represented by the above formulas (II) and (III).

Further, vertical alignment capability or pretilt angle generation capability is preferably provided to the liquid crystal aligning agent of the present invention by introducing at least one hydrophobic group (may also be referred to as "specific hydrophobic group" hereinafter) selected from the group consisting of alkyl group having 10 to 30 carbon atoms, alicyclic skeleton-containing group having 10 to 30 carbon atoms and fluorine-containing organic group having 2 or more carbon atoms into the side chain of the specific polymer contained in the liquid crystal aligning agent. The term "pretilt angles" in this patent represents the inclination angle of liquid crystal molecules from a direction parallel to the plane of the substrate.

Examples of the alkyl group having 10 to 30 carbon atoms include linear alkyl groups such as n-decyl group, n-dodecyl group, n-tetradecyl group, n-pentadecyl group, n-hexadecyl group, n-octadecyl group and n-eicosyl group. Examples of the alicyclic skeleton-containing group having 10 to 30 carbon atoms include cholesteryl group and cholestanyl group. Examples of the fluorine-containing organic group include 1,1,1-trifluoroethyl group, pentafluoroethyl group, 4-fluorocycldhexyl group, pentafluorocyclohexyl group, 4-fluorophenyl group, pentafluorophenyl group and a group represented by the following formula (i). The above alkyl group, alicyclic skeleton-containing group and fluorine-containing organic group may be bonded by a group such as —O—, —CO—, —COO—, —OCO—, —NHCO—, —CONH— or —S—.

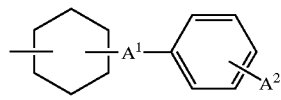

(i)

($A^1$ is a divalent group represented by —O—, —CO—, —COO—, —OCO—, —NHCO—, —CONH— or —S—, and $A^2$ is a fluorine atom or trifluoromethyl group.)

Out of these, an alkyl group having 10 to 30 carbon atoms and an alicyclic skeleton-containing group having 10 to 30 carbon atoms are preferred, a linear alkyl group having 15 to 20 carbon atoms, cholesteryl group and cholestanyl group are more preferred, and n-hexadecyl group and n-octadecyl group are particularly preferred.

The above hydrophobic group may be contained in the unit represented by the above formula (I) in the specific polymer. In this case, the hydrophobic group is contained in at least one of the groups represented by $S^1$, $T^1$, $Z^1$ and $Z^2$. It is preferably contained in at least one of the groups represented by $S^1$ and $T^1$, particularly preferably contained in the group represented by $S^1$. The unit containing the hydrophobic group may be copolymerized with the unit represented by the above formula (I).

Examples of the polymer constituting the liquid crystal aligning agent of the present invention are specific polymers containing a polyamic acid ester structure having a specific structure in the side chain. These specific polymers may be used alone or in combination of two or more.

The liquid crystal aligning agent of the present invention may contain another polymer in limits that do not impair the effect of the present invention. Examples of the another polymer include polyamic acid and polyimide.

The amount of the polyamic acid ester structure having a specific structure in the side chain is generally 10 to 100%, preferably 30 to 100%. particularly preferably 50 to 100% based on the total of all the recurring units of the polymer constituting the liquid crystal aligning agent.

The amount of the structure having a specific hydrophobic group, which differs according to a required pretilt angle. is generally 3 to 50%, preferably 5 to 30%, particularly preferably 10 to 15% based on the total of all the recurring units of the polymer constituting the liquid crystal aligning agent when the liquid crystal aligning agent is used in a homeotropic alignment mode. When it is used in a mode other than the homeotropic alignment mode, the upper limit of the amount, which differs according to a targeted pretilt angle, is generally 30%.

The above specific polymer is prepared by obtaining polyamic acid by polycondensing (1) a tetracarboxylic dianhydride represented by the following formula (I-1) and (2) a diamine compound represented by the following formula (I-2) and then reacting the polyamic acid with (3) a halide having a specific group, (4) an alcohol having a specific group or (5) a phenol having a specific group.

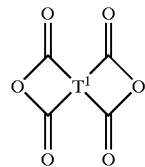

(I-1)

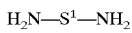

(I-2)

In the above formulas, $T^1$ and $S^1$ are as defined in the above formula (I).

Examples of the tetracarboxylic dianhydride include aliphatic and alicyclic tetracarboxylic dianhydrides such as 2,3,5-tricarboxycyclopentylacetic dianhydride, butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 3,5,6-tricarboxynorbornane-2-acetic dianhydride, 2,3,4,5-tetrahydrofurantetracarboxylic dianhydride. 1,3,3a,4,5,9b-hexahydro-5-(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic dianhydride and bicyclo[2.2.2]-oct-7-ene-2,3,5,6-tetracarboxylic dianhydride; and aromatic tetracarboxylic dianhydrides such as pyromellitic dlanhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenetetracarboxylic dianhydride, 3,3',4,4'-biphenyltetracarboxylic dianhydride, bis(phthalic acid)phenylphosphine oxide dianhydride, p-phenylene-bis(triphenylphthalic)dianhydride, m-phenylene-bis(triphenylphthalic)dianhydride, bis(triphenylphthalic acid)-4,4'-diphenylether dianhydride and bis(triphenylphthalic acid)-4,4'-diphenylmethane dianhydride.

Examples of the tetracarboxylic dianhydrlde having a specific hydrophobic group include compounds represented by the following chemical formulas (1) to (14).

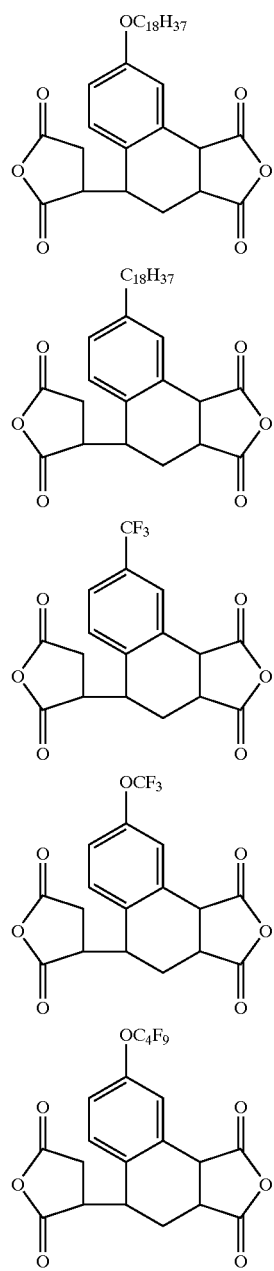

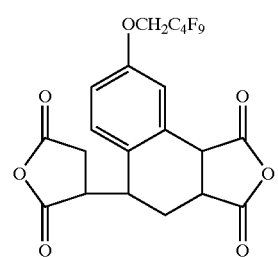

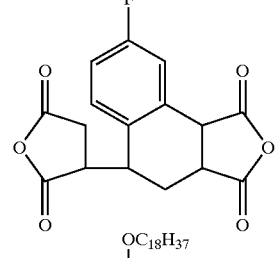

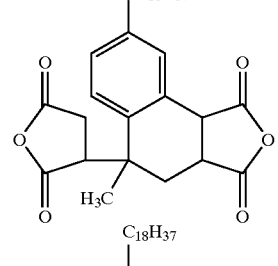

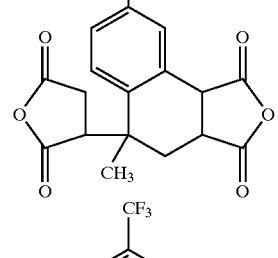

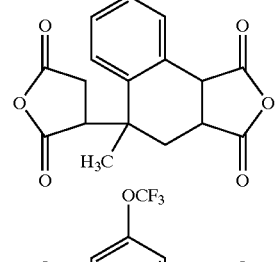

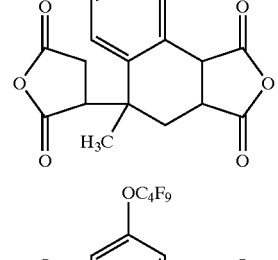

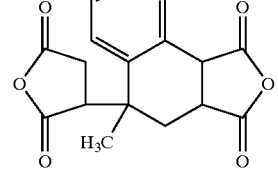

-continued

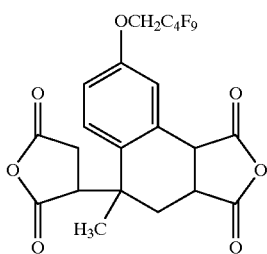

(13)

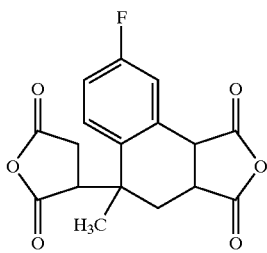

(14)

Out of these, preferred are 2,3,5-tricarboxycyclopentylacetic dianhydride, butanetetracarboxylic dianhydride, 1,3-dimethyl-1,2,3,4-cyclobutanetetracarboxylic dianhydride, 1,2,3,4-cyclobutanetetracarboxylic dianhydride, pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride and compounds represented by the above formulas (1) to (14). They may be used alone or in combination of two or more.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl sulfide, 4,4'-diaminodiphenylsulfone, 3,3'-dimethyl-4,4'-diaminobiphenyl, 4,4'-diaminobenzanilide, 4,4'-diaminodiphenyl ether, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trlmethylindane, 3,4'-diaminodlphenyl ether, 2,2-bis(4-aminophenoxy)propane, 2,2-bis[4-(4-aminophenoxy)phenyl]propane, 2,2-bis[4-(4-aminophenoxy)phenyl]hexafluoropropane. 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 1,4,4'-(p-phenyleneisopropylidene)bisaniline, 4,4'-(m-phenyleneisopropylldene)bisaniline, 2,2'-bis[4-(4-amino-2-trifluoromethylphenoxy)phenyl] hexafluoropropane, 4,4'-diamino-2,2'-bis(trifluoromethyl)biphenyl and 4,4'-bis[(4-amino-2-trifluoromethyl)phenoxy]-octafluorobiphenyl; aromatic diamines having a hetero atom such as diaminotetraphenyl thiophene; aliphatic and alicyclic diamines such as 1,1-metaxylenediamine, 1,3-propanediamine, tetramethylenediamine, pentamethylenediamine, hexamethylenediamine, heptamethylenediamine, octamethylenediamine, nonamethylenediamine, 4,4'-diaminoheptamethylenediamine. 1,4-diaminocyclohexane, isophoronediamine, tetrahydrodicyclopentadienylenediamine, hexahydro-4,7-metanoindanylenedimethylenediamine, tricyclo[6.2.1.0$^{2.7}$]-undecylenedimethyldiamine and 4,4'-methylenebis(cyclohexylamine); and diaminoorganosiloxanes such as diaminohexamethyldisiloxane.

Examples of the diamine compound having a specific hydrophobic group include 1-dodecyloxy-2,4-diaminobenzene, 1-tetradecyloxy-2,4-diaminobenzene, 1-pentadecyloxy-2,4-diaminobenzene, 1-hexadecyloxy-2,4-diaminobenzene, 1-octadecyloxy-2,4-diaminobenzene, 1-cholesteryloxy-2,4-diaminobenzene, 1-cholestanyloxy-2,4-diaminobenzene, dodecyloxy(3,5-diamonbenzoyl), tetradecyloxy(3,5-diaminobenzoyl), pentadecyloxy(3,5-diaminobenzoyl), hexadecyloxy(3,5-diaminobenzoyl), octadecyloxy(3,5-diaminobenzoyl), cholesteryloxy(3,5-diaminobenzoyl), cholestanyloxy(3,5-diaminobenzoyl), (2,4-diamlnophenoxy)palmitate, (2,4-diamlnophenoxy)stearate, (2,4-diaminophenoxy)-4-trifluoromethyl benzoate, and compounds represented by the following formulas (15) and (16).

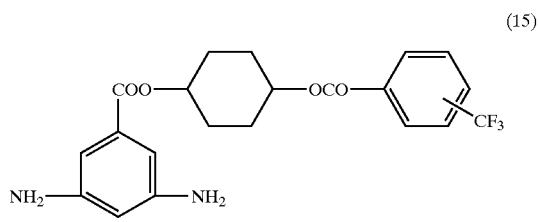

(15)

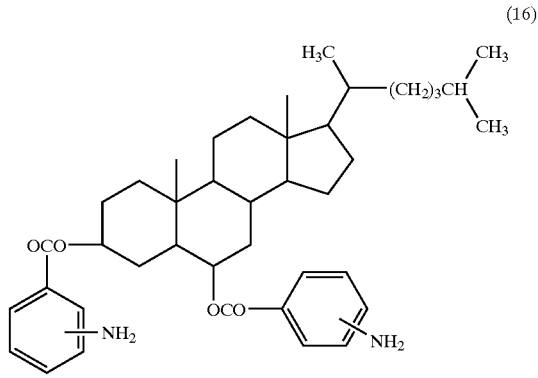

(16)

Out of these, preferred are p-phenylenediamine, 4,4'-diaminodiphenylmethane, 1,5-diaminonaphthalene, 2,7-diaminofluorene, 4,4'-diaminodiphenyl ether, 4,4'-(p-phenyleneisopropylidene)bisaniline, 2,2-bis[4-(4-aminophenoxy)phenyl]hexafluoropropane, 2,2-bis(4-aminophenyl)hexafluoropropane, 2,2'-bis[4-(4-amino-2-trifluoromethylphenoxy)phenyl] hexafluoropropane, 4,4'-diamino-2,2'-bis(trifluoromethyl)biphenyl, 4,4'-bis[(4-amino-2-trifluoromethyl)phenoxy]-octafluorobiphenyl, 1-hexadecyloxy-2,4-diaminobenzene, 1-octadecyloxy-2,4-diaminobenzene, 1-cholesteryloxy-2,4-diaminobenzene, 1-cholestanyloxy-2,4-diaminobenzene, hexadecyloxy(3,5-diaminobenzoyl), octadecyloxy(3,5-diaminobenzoyl), cholesteryloxy(3,5-diaminobenzoyl) and cholestanyloxy(3,5-diaminobenzoyl). They may be used alone or in combination of two or more.

Examples of the halide having a specific group include 1-bromo-3-(4-chalconyloxy)propane, 1-bromo-3-(4'-chalconyloxy)propane, 1-bromo-4-(4-chalconyloxy)butane, 1-bromo-4-(4'-chalconyloxy)butane, 1-bromo-6-(4-chalconyloxy)hexane, 1-bromo-6-(4'-chalconyloxy)hexane, 1-chloro-3-(4-chalconyloxy)propane, 1-chloro-3-(4'-chalconyloxy)propane, 1-chloro-4-(4-chalconyloxy)butane, 1-chloro-4-(4'-chalconyloxy)butane, 1-chloro-6-(4-chalconyloxy)hexane, 1-chloro-6-(4'-chalconyloxy)hexane, 1-bromo-3-(4'-fluoro-4-chalconyloxy)propane, 1-bromb-3-(4-fluoro-4'-chalconyloxy)propane, 1-bromo-4-(4'-fluoro-4-chalconyloxy)butane, 1-bromo-4-(4-fluoro-4'-chalconyloxy)butane, 1-bromo-6-(4'-fluoro-4-chalconyloxy)hexane, 1-bromo-6-(4-fluoro-4'-chalconyloxy)hexane, 1-chloro-3-(4'-fluoro-4-chalconyloxy)propane, 1-chloro-3-(4-fluoro-4'-chalconyloxy)propane, 1-chloro-4-(4'-fluoro-4-chalconyloxy)butane, 1-chloro-4-(4-fluoro-4'-chalconyloxy)butane, 1-chloro-6-(4'-fluoro-4-chalconyloxy)hexane and 1-chloro-6-(4-fluoro-4'-chalconyloxy)hexane. They may be used alone or in combination of two or more.

Out of these, 1-bromo-6-(4-chalconyloxy)hexane and 1-bromo-6-(4'-fluoro-4-chalconyloxy)hexane are preferred.

Examples of the alcohol having a specific group include 3-(4-chalconyloxy)-1-propanol, 3-(4'-chalconyloxy)-1-propanol, 4-(4-chalconyloxy)-1-butanol, 4-(4'-chalconyloxy)-1-butanol, 6-(4-chalconyloxy)-1-hexanol, 6-(4'-chalconyloxy)-1-hexanol, 3-(4'-fluoro-4-chalconyloxy)-1-propanol, 3-(4-fluoro-4'-chalconyloxy)-1-propanol, 4-(4'-fluoro-4-chalconyloxy)-1-butanol, 4-(4-fluoro-4'-chalconyloxy)-1-butanol, 6-(4'-fluoro-4-chalconyloxy)-1-hexanol and 6-(4-fluoro-4'-chalconyloxy)-1-hexanol. They may be used alone or in combination of two or more. Out of these, 6-(4-chalconyloxy)-1-hexanol and 6-(4'-fluoro-4-chalconyloxy)-1-hexanol are preferred.

Examples of the phenol having a specific group include 4-hydroxychalcone, 4'-hydroxychalcone, 4'-hydroxyfluoro-4-chalcone and 4-fluoro-4'-hydroxychalcone. They may be used alone or in combination of two or more.

In the synthesis of the specific polymer used in the present invention, a halide, alcohol or phenol having no specific group may be used in combination with a halide, alcohol or phenol having a specific group to improve the properties of the specific polymer and provide pretilt angle developing capability or homeotropic alignment capability to the specific polymer.

Examples of the above halide include cetyl bromide, stearyl bromide, methyl bromide, ethyl bromide, propyl bromide, cetyl chloride, steary chloride, methyl chloride, ethyl chloride, propyl chloride and 1,1,1-trifluoro-2-iodoethane. Out of these, stearyl bromide, 1,1,1-trifluoro-2-iodoethane, cetyl chloride and stearyl chloride are preferred. They may be used alone or in combination of two or more.

Examples of the above alcohol include cetyl alcohol, stearyl alcohol, 1,1,1-trifluoroethanol, methanol, ethanol, isopropanol and normal propanol. Out of these, cetyl alcohol, stearyl alcohol and 1,1,1-trifluoroethanol are preferred. They may be used alone or in combination of two or more.

Examples of the above phenol include phenol, cresol, 4-cetyloxyphenol, 4-cetylphenol,4-stearyloxyphenol, 4-stearylphenol and 4-trifluoromethylphenol. They may be used alone or in combination of two or more.

The specific polymer used in the present invention is prepared by obtaining polyamic acid by polycondensing (1) the above tetracarboxylic dianhydride and (2) the above diamine compound and then reacting the polyamic acid with (3) a halide having a specific group, (4) an alcohol having a specific group or (5) a phenol having a specific group in the presence of a catalyst as required.

Examples of the catalyst used in the reaction between the polyamic acid and the halide having a specific group include basic catalysts such as lithium hydroxide, sodium hydroxide, potassium hydroxide, lithium carbonate, sodium carbonate, potassium carbonate, sodium methoxide, potassium methoxide, sodium ethoxide, potassium ethoxide, sodium propoxido, potassium propoxide, sodium butoxide, potassium butoxide, trimethylamine, triethylamine and pyridine.

The catalyst used in the reaction between the polyamic acid and the alcohol or phenol having a specific group is a dehydrating catalyst such as dicyclohexyl carbodimide and methyl chloroformate. The dehydrating catalyst may be used in combination with a cocatalyst such as dimethylamino pyridine as required.

Solvent

The liquid crystal aligning agent of the present invention contains a solution of a polymer having a structure represented by the above formula (I). The solvent used to prepare the solution is not particularly limited if it is an organic solvent capable of dissolving the polymer. Examples of the solvent include aprotic polar solvents such as N-methyl-2-pyrrolidone, N,N-dimethylacetamide, N,N-dimethylformamide, dimethyl sulfoxide, γ-butyrolactone, tetramethylurea and hexamethylphosphor triamide; phenolic solvents such as m-cresol, xylenol, phenol and halogenated phenol; halogenated solvents such as chlorobenzene, dichloroethane and tetrachloroethane; and ketone-based solvents such as cyclohexanone. They may be used alone or in combination of two or more. A poor solvent for the used polymer may be used in combination with the above solvent in limits that do not precipitate the polymer.

Other Additives

The liquid crystal aligning agent used in the present invention may contain a thermosetting crosslinking agent to improve the stability of a pretilt angle and the strength of a coating film. As the thermosetting crosslinking agent is effective a polyfunctional epoxy-containing compound such as bisphenol A epoxy resin, phenolic novolak epoxy resin, cresol novolak epoxy resin, alicyclic epoxy resin, glycidyl ester-based epoxy resin, glycidyl diamine-based epoxy resin, heterocyclic epoxy resin or epoxy group-containing acrylic resin. Commercially available products of the thermosetting crosslinking agent include Epolite 400E and 3002 (of Kyoeisha Chemical Co., Ltd.) and Epicoat 828 and 152 and Epoxy Novolak 180S (of Yuka Shell Epoxy Co., Ltd.).

Further, when the above polyfunctional epoxy-containing compound is used, a basic catalyst such as 1-benzyl-2-methylimidazole may be added to cause a crosslinking reaction efficiently.

The liquid crystal aligning agent of the present invention may contain a functional silane-containing compound to improve adhesion to a substrate. Examples of the functional silane-containing compound include 3-aminopropyltrimethoxysilane, 3-aminopropyltriethoxysilane, 2-aminopropyltrimethoxysilane, 2-aminopropyltriethoxysilane, N-(2-aminoethyl)-3-amlnopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trilmethoxysilyl-3,6-diazanonylacetate, 9-trlethoxysilyl-3,6-diazanonylacetate, N-benzyl-3- aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane and a reaction product of a tetracarboxylic dianhydride and an amino group-containing silane compound disclosed in JP-A 63-291922.

Liquid Crystal Alignment Film

The following method, for example, is used to form a liquid crystal alignment film from the liquid crystal aligning agent of the present invention. The liquid crystal aligning agent of the present invention is first applied to the transparent conductive film side of a substrate having the transparent conductive film by roll coatings spinner coating or printing and heated at a temperature of 40 to 200° C. to form a coating film. The thickness of the coating film is preferably 0.001 to 1 μm, more preferably 0.005 to 0.5 μm in terms of solid content. The above substrate is, for example, a transparent substrate made from glass, or a plastic film of polyethylene terephthalate, polybutylene terephthalate, polyether sulfone or polycarbonate. The above transparent conductive film may be an indium oxide-based or tin oxide-based film. Photolithography or printing can be used for the patterning of the transparent conductive film. Before the application of the liquid crystal aligning agent, a functional silane-containing compound or titanate may be applied to the substrate and transparent conductive film In order to improve adhesion between the substrate/transparent conductive film and the coating film.

Thereafter, the above coating film is exposed to linearly polarized or partially polarized radiation or nonpolarized radiation and optionally further heated at a temperature of 150 to 250° C. to provide liquid crystal aligning capability. The radiation may be ultraviolet light to visible radiation having a wavelength of 150 nm to 800 nm, preferably ultraviolet light having a wavelength of 320 nm to 450 nm. When the used radiation is linearly polarized or partially polarized radiation, illumination may be carried out from a direction perpendicular to the plane of the substrate, obliquely to provide a pretilt angle, or by combining these. When the radiation is nonpolarized radiation, illumination must be carried out at an angle from the plane of the substrate. The light source of the above radiation is, for example, a low-pressure mercury lamp, high-pressure mercury lamp, deuterium lamp, metal halide lamp, argon resonance lamp, xenon lamp, excimer laser or the like. The ultraviolet light having the above preferred wavelength range can be obtained by combining a filter or diffraction grating with the above light source. It can be simply obtained by using a Pyrex (registered trademark) glass polarizer which does not transmit ultraviolet light having a wavelength shorter than 320 nm in conjunction with the above light source.

At the time of exposure to radiation, it is preferred that the above coating film should be heated at a temperature ranging from the glass transition temperature of the polymer having a chalcone structure to a temperature 100° C. higher than the glass transition temperature, for example, 50 to 300° C. or that the coating film should contain a solvent in an amount of 1 to 20 wt % based on the polymer. Heating is particularly preferred. The solvent used to dissolve the above liquid crystal aligning agent may be directly used as the above solvent. After exposure to radiation, the coating film may be heated at a temperature of 150 to 250° C. as described above.

Liquid Crystal Display Element

The liquid crystal display element is produced by using the liquid crystal aligning agent of the present invention as follows, for example. Two substrates having the above liquid crystal alignment film are opposed to each other in such a manner that the polarization directions of linearly polarized radiation applied to the liquid crystal alignment films form a predetermined angle and assembled together by a sealer, liquid crystals are filled into the gap between the substrates, and a filling hole is sealed up to assemble a liquid crystal cell. It is desired that flow-induced alignment at the time of filling liquid crystals should be removed by treating the cell above the isotropic temprature and then cooling it to room temperature. A polarizer is affixed to the both sides of the cell in such a manner that the polarization directions of the polarizers have a predetermined angle from the polarization directions of the respective linearly polarized radiation to construct a liquid crystal display element. When the liquid crystal alignment film is of a horizontal alignment mode, the angle formed by the polarization directions of the linearly polarized radiation and the angle between each of the substrates and each of the polarizers are adjusted to obtain a TN, STN or IPS liquid crystal display element. When the liquid crystal alignment film is of a homeotropic alignment mode, the cell is constituted such that the directions of aligning axes of the two substrates having a liquid crystal alignment film become anti-parallel to each other and assembled with polarizers in such a manner that the polarization directions of the polarizers have an angle of 45° from the respective aligning axes to construct a liquid crystal display element having a vertically aligning liquid crystal cell.

The above sealer is, for example, an epoxy resin containing aluminum oxide spheres or the like as a curing agent and spacer.

The above liquid crystals are, for example, nematic or smectic liquid crystals. In the case of a TN liquid crystal cell and an STN liquid crystal cell, the liquid crystals are preferably composed of liquid crystal molecules having positive dielectric anisotropy for forming nematic liquid crystals, such as Schiff base liquid crystals, azoxy-based liquid crystals, biphenyl-based liquid crystals, phenylcyclohexane-based liquid crystals, ester-based liquid crystals, terphenyl-based liquid crystals, biphenylcyclohexane-based liquid crystals, pyrimidine-based liquid crystals, dioxane-based liquid crystals, bicyclooctane-based liquid crystals or cubane-based liquid crystals. To the above liquid crystals may be added cholesteric liquid crystals such as cholestyl chloride, cholesteryl nonanoate or cholesteryl carbonate, or a chiral agent marketed under the trade name of C-15 or CB-15 (of Merck Co., Ltd.) before use. Further, ferroelectric liquid crystals such as p-decyloxybenzylidene-p-amino-2-methylbutyl cinnamate may also be used. In the case of a homeotropically aligning liquid crystal cell, the liquid crystals are preferably composed of liquid crystal molecules having negative dielectric anisotropy for forming nematic liquid crystals, such as dicyanobenzene-based liquid crystals, pyridazine-based liquid crystals, Schiff base liquid crystals, azoxy-based liquid crystals, biphenyl-based liquid crystals or phenylcyclohexane-based liquid crystals. In the case of an IPS liquid crystal cell, the liquid crystals may be preferably composed of the above-described liquid crystal molecules having positive or negative dielectric anisotropy for forming nematic liquid crystals.

The polarizer affixed to the exterior sides of the liquid crystal cell is a polarizer manufactured by sandwiching a polarizing film called "H film" which absorbs iodine while polyvinyl alcohol is stretched and aligned between cellulose acetate protective films, or the H film itself.

EXAMPLES

The following examples are provided for the purpose of further illustrating the present invention but are in no way to be taken as limiting.

Synthesis Example 1
Polymerization of Polyamic Acid 0.1 mol (22.4 g) of 2,3,5-tricarboxycyclopentylacetic dianhydride and 0.1 mol (10.8 g) of p-phenylenediamine were dissolved in 300 g of N-methyl-2-pyrrolidone and reacted at 60° C. for 6 hours. Thereafter, the reaction mixture was added to an excessive amount of methanol to precipitate a reaction product. The precipitate was then washed with methanol and dried at 40° C. under reduced pressure for 15 hours to produce 27.4 g of polyamic acid (to be referred to as "polymer 1a" hereinafter).

Synthesis of Specific Polymer 350 g of N-methyl-2-pyrrolidone, 38.7 g of 1-bromo-6-(4-chalconyloxy)hexane and 13.8 g of potassium carbonate were added to 16.6 g of the obtained polymer 1a to carry out a reaction at 120° C. for 4 hours. Thereafter, the reaction mixture solution was added to water to precipitate a reaction product. The obtained precipitate was then washed with water and dried under reduced pressure for 15 hours to produce 35.4 g of polyamic acid ester (to be referred to as "polymer 1b" hereinafter).

Synthesis Example 2
Polymerization of Polyamic Acid 0.1 mol (22.4 g) of 2,3,5-tricarboxycyclopentylacetic dianhydride, 0.09 mol (9.73 g) of p-phenylenediamine and 0.01 mol (5.22 g) of cholestanyloxy(3,5-diaminobenzoyl) were dissolved in 350 g of N-methyl-2-pyrrolidone and reacted at 60° C. for 6 hours. Thereafter, the reaction mixture was added to an excessive amount of methanol to precipitate a reaction product. The precipitate was then washed with methanol and dried at 40° C. under reduced pressure for 15 hours to produce 34.2 g of polyamic acid (to be referred to as "polymer 2a" hereinafter).

Synthesis of Specific Polymer 300 g of N-methyl-2-pyrrolidone, 41.3 g of 1-bromo-8-(4-chalconyloxy)octane and 13.8 g of potassium carbonate were added to 14.9 g of the obtained polymer 2a to carry out a reaction at 120° C. for 4 hours. Thereafter, the reaction mixture solution was added to water to precipitate a reaction product. The obtained precipitate was washed with water and dried under reduced pressure for 15 hours to produce 43.9 g of polyamic acid ester (to be referred to as "polymer 2b" hereinafter).

Synthesis Example 3
Synthesis of Specific Polymer 16.6 of polymer 1a, 32.4 g of 6-(4-chalconyloxy)-1-hexanol and 12 g of dimethylaminopyrldine were added to 100 ml of chloroform. This mixture was added to 23 g of dicyclohexylcarbodiimide under agitation and kept stirred for another 3 hours. A precipitate was separated from the obtained reaction solution and removed, the solution was washed with 0.5 N hydrochloric acid, an aqueous saturated solution of sodium bicarbonate and pure water sequentially, and then the reaction mixture solution was added to methanol to precipitate a reaction product. The obtained precipitate was washed with water and dried under reduced pressure for 15 hours to produce 42.8 g of polyaric acid ester (to be referred to as "polymer 3b" hereinafter).

Synthesis Example 4
Polymerization of Polyamic Acid 0.1 mol (22.4 g) of 2,3,5-tricarboxycyclopentylacetic dianhydride, 0.09 mol (9.73 g) of p-phenylenedlamine and 0.01 mol (3.77 g) of 1-octadecyloxy-2,4-diaminobenzene were dissolved in 300 g of N-methyl-2-pyrrolidone and reacted at 60° C. for 6 hours.

Thereafter, the reaction mixture was then added to an excessive amount of methanol to precipitate a reaction product. The precipitate was then washed with methanol and dried at 40° C. under reduced pressure for 15 hours to produce 33.7 g of polyamic acid (to be referred to as "polymer 4a" hereinafter).

Synthesis of Specific Polymer 350 g of N-methyl-2-pyrrolidone, 41.3 g of 1-bromo-8-(4-chalconyloxy)hexane and 13.8 g of potassium carbonate were added to 17.9 g of polymer 4a to carry out a reaction at 120° C. for 4 hours.

Thereafter, the reaction mixture solution was added to water to precipitate a reaction product. The obtained precipitate was washed with water and dried under reduced pressure for 15 hours to produce 35.8 g of polyamric acid ester (to be referred to as "polymer 4b" hereinafter).

Synthesis Example 5
Synthesis of Specific Polymer 350 g of N-methyl-2-pyrrolidone, 41.3 g of 1-bromo-8-(4-chalconyloxy)octane and 13.8 g of potassium carbonate were added to 16.6 g of polymer 1a to carry out a reaction at 120° C. for 4 hours. Thereafter, the reaction mixture solution was added to water to precipitate a reaction product. The obtained precipitate was washed with water and dried under reduced pressure for 15 hours to produce 36.7 g of polyamic acid ester (to be referred to as "polymer 5b" hereinafter).

Comparative Synthesis Example 1
Imidization Reaction 380 g of N-methyl-2-pyrrolidone, 9.5 g of pyridilne and 12.3 g of acetic anhydride were added to 20.0 g of polymer 1a to carry out an imidization reaction at 120° C. for 4 hours. Thereafter, the reaction mixture solution was added to an excessive amount of methanol to precipitate a reaction product. The precipitate was then washed with methanol and dried under reduced pressure for 15 hours to produce 15.3 g of polyimidd (to be referred to as "polymer Ab" hereinafter).

Comparative Synthesis Example 2
Synthesis of Polymethacrylate 2 g of 4'-methacryloyloxychalcone and 50 mg of azobisisobutyronitrile were dissolved in 10 ml of tetrahydrofuran and refluxed in nitrogen atmosphere for 10 hours. The obtained viscous reaction mixture was added to methanol to precipitate a polymer which was then dried to produce 2.2 g of a polymer (to be referred to as "polymer Bb" hereinafter).

Reference Example

The polymer Ab obtained in Comparative Synthesis Example 1 was dissolved in γ-butyrolactone to prepare a solution having a solid content of 4 wt % which was then filtered with a filter having an opening diameter of 1 μm so as to prepare a liquid crystal aligning agent solution. This solution was applied to the transparent electrode side of a glass substrate having the transparent electrode made of an ITO film to a thickness of 0.1 μm by a spinner and dried at 180° C. for 1 hour to form a coating film. This coating film was rubbed by a rubbing machine having a roll wound with nylon cloth at a roll revolution of 500 rpm and a stage moving speed of 1 cm/sec. Thereafter, an epoxy resin adhesive containing aluminum oxide spheres having a diameter of 17 μm was applied to the light crystal alignment film formed surfaces of a pair of the above rubbed substrates by screen printing, the substrates were placed one upon the other and contact bonded together in such a manner the rubbing directions of the substrates became perpendicular to each other, and the adhesive was thermally cured at 150° C. for 1 hour. Thereafter, nematic liquid crystals (ZLI-1565 of Merck Co., Ltd.) were filled into the gap between the pair of substrates from a liquid crystal filling hole which was then sealed up by an epoxy-based adhesive. In order to remove flow-induced alignment at the time of filling the liquid crystals, after the laminate was heated at 150° C. and gradually cooled to room temperature, a polarizer was affixed to the exterior sides of the substrates in such a manner that the polarization directions of the polarizers became the rubbing directions of the liquid crystal alignment films of the respective substrates to construct a liquid crystal display element. The alignment of the liquid crystals was satisfactory; When a voltage of 5 V was applied, it was observed that the liquid crystal display element turned bright and dark in response to ON-OFF of the applied voltage.

Example 1

A thin film was formed on a substrate from the specific polymer 1b obtained in Synthesis Example 1 in the same manner as in Reference Example.

While the substrate was heated at 100° C., the surface of the thin film was exposed to 0.5 J/cm$^2$ of linearly polarized ultraviolet light having a main wavelength of 365 nm through the SPF-50C-32 Pyrex (registered trademark) glass polarizer (of Sigma Koki Co., Ltd.) using a Hg—Xe lamp. When a liquid crystal display element was manufactured in the same manner as in Reference Example except that the direction of assembling together the liquid crystal alignment films was changed to the polarization direction of ultraviolet light from the rubbing direction, the alignment of the liquid crystals was satisfactory. When voltage was applied under the same condition as Reference Example, it was observed that the liquid crystal display element turned bright and dark in response to ON-OFF of the applied voltage. When the pretilt angle was measured by a crystal rotation method using He—Ne laser light, it was 0.5°.

Examples 2 and 3

When liquid crystal display elements were manufactured in the same manner as in Example 1 except that the specific polymers 2b and 3b obtained in Synthesis Examples 2 and 3 were used, respectively, the alignment of the liquid crystals was satisfactory. When voltage was applied under the same condition as in Example 1, it was observed that the liquid crystal display elements turned bright and dark in response to ON-OFF of the applied voltage. The pretilt angles of Examples 2 and 3 were 2.5° and 0.5°, respectively.

Example 4

A liquid crystal display element was manufactured in the same manner as in Example 1 except that the specific polymer 2b obtained in Synthesis Example 2 was used, the direction for assembling together the liquid crystal alignment films was changed to ensure that the polarization directions of the applied ultraviolet radiation became antiparallel, nematic liquid crystals having negative dielectric anisotropy (MLC-6608 of Merck Co., Ltd.) were used as the liquid crystals, and the direction for assembling the polarizers had an angle of 45° from the polarization direction of ultraviolet light.

In this liquid crystal display element, the liquid crystals were aligned homeotropically and the alignment thereof was satisfactory. When a voltage of 12 V was applied, the alignment of the liquid crystals in a direction parallel to the polarization plane of the applied ultraviolet light was observed.

Example 5

When a liquid crystal display element was manufactured in the same manner as in Example 1 except that the specific polymer 4b obtained in Synthesis Example 4 was used, the alignment of the liquid crystals was satisfactory. When voltage was applied under the same condition as in Example 1, it was observed that the liquid crystal display element turned bright and dark in response to ON-OFF of the applied voltage. The pretilt angle was 17°.

Example 6

A liquid crystal display element was manufactured in the same manner as in Example 4 except that the specific polymer 4b obtained in Synthesis Example 4 was used.

In this liquid crystal display element, the liquid crystals were aligned homeotropically that they were slightly inclined toward the polarization direction of the applied ultraviolet light and had a pretilt angle of 89°. The alignment of the liquid crystals was satisfactory. When voltage was applied to this liquid crystal display element under the same condition as in Example 4, the alignment of the liquid crystals in a direction parallel to the polarization plane of the applied ultraviolet light was observed.

Example 7

A thin film was formed in the same manner as in Example 1 except that the specific polymer 5b obtained in Synthesis Example 5 was used and a glass substrate having a comblike transparent electrode made of an ITO film was used as the substrate.

While the substrate was heated at 100° C., the surface of the thin film was exposed to linearly polarized ultraviolet light (irradiation intensity of 24 mW) having a main wavelength of 365 nm through the SPF-50C-32 Pyrex (registered trademark) glass polarizer (of Sigma Koki Co., Ltd.) at an angle of 90° between the polarization direction of ultraviolet light and the longitudinal direction of the comblike electrode using an Hg—Xe lamp. The dosage of the ultraviolet light was 5 J/cm$^2$. Two substrates having a liquid crystal alignment film formed by this exposure step were assembled together in such a manner that the liquid crystal aligning directions thereof became parallel to each other in order to manufacture a 3.5 μm-thick cell, and the MLC-2043 liquid crystals (of Merck Co., Ltd.) were filled into the gap between the substrates to manufacture an IPS mode liquid crystal display element. The alignment of the obtained element was satisfactory. When the response characteristics of the element at the time of turning on and off were evaluated by the following method, the element had excellent response characteristics with a rise time of 15 msec. The alignment of the liquid crystals was satisfactory. The pretilt angle of the liquid crystals measured by a crystal rotation method was 0.1°. The visual properties of the obtained element are shown in FIG. 1.

<Evaluation Method of Response Characteristics>

After a voltage for obtaining a half-tone display state was applied to the liquid crystal cell, the T2–T1 value (T1 represents a time when the voltage is turned off and T2 represents a time when the transmission of the liquid crystal cell becomes 10% of the transmission at the time of OFF) was obtained. As this value becomes smaller, the response characteristics (rise time) of the liquid crystal display element improve. The voltage applied to the liquid crystal cell was 2.5 V with a 64 Hz rectangular wave.

Comparative Example 1

After a thin film was formed on the substrate in the same manner as in Example 1 except that the polymer Ab obtained in Comparative Synthesis Example 1 was used, a liquid crystal alignment film was formed by exposing the thin film to linearly polarized ultraviolet light. Thereafter, when a liquid crystal display element was manufactured by using this in the same manner as in Example 1, the alignment of liquid crystals was not observed.

Comparative Example 2

After a thin film was formed on the substrate in the same manner as in Example 1 except that the polymer Bb obtained in Comparative Synthesis Example 2 was used, a liquid crystal alignment film was formed by exposing the thin film to linearly polarized ultraviolet light. Thereafter, when a liquid crystal display element was manufactured by using this in the same manner as in Example 1, the alignment of liquid crystals was not observed. When a liquid crystal display element was manufactured in the same manner as in Example 1 except that the step of curing an adhesive after the contact bonding of the substrates was carried out by ultraviolet light and not by heat, the excellent alignment of liquid crystals was observed.

The liquid crystal alignment film formed from the liquid crystal aligning agent of the present invention has higher thermal stability in the alignment of liquid crystals than a liquid crystal alignment film formed by a conventional photo-alignment method, thereby making it possible to manufacture a liquid crystal display element having excellent display characteristics. The liquid crystal alignment film having homeotropically aligning capability formed from the liquid crystal aligning agent of the present invention has azimuthal anchoring force for liquid crystal molecules in a direction within the plane of the substrate at the time of applying voltage. Therefore, when this is used in a homeotropic alignment liquid crystal display element, excellent display characteristics can be obtained. Since a liquid crystal alignment film which exhibits a pretilt angle of 10° or more stably can be formed from the liquid crystal aligning agent of the present invention, it can be effectively used in an OCB mode liquid crystal display element. Further, a liquid crystal display element of an IPS mode having excellent visual characteristics and display characteristics can be obtained by using the liquid crystal aligning agent of the present invention. Further, a liquid crystal alignment film formed from the liquid crystal aligning agent of the present invention has excellent in-plane uniformity and can obtain high display performance when it is used in a TN, STN or homeotropic alignment liquid crystal display element. Therefore, it can be effectively used in various devices. For instance, it can be advantageously used in the display devices of desk-top computers, wristwatches, clocks, coefficient display boards, word processors, personal computers and liquid crystal TVs.

What is claimed is:

1. A liquid crystal aligning agent comprising a polymer having a structure represented by the following formula (I):

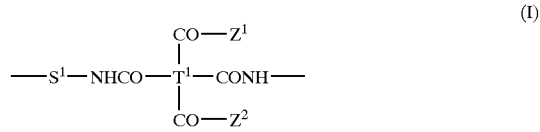

wherein $S^1$ is a divalent organic group, $T^1$ is a tetravalent organic group, and $Z^1$ and $Z^2$ are each independently a hydroxyl group or monovalent organic group, wherein at least one of $Z^1$ and $Z^2$ is at least one group selected from the group consisting of a monovalent organic group represented by formula (II):

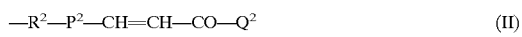

wherein $Q^2$ is a monovalent organic group having an aromatic ring, $P^2$ is a divalent organic group having an aromatic ring, and $R^2$ is a divalent bonding group, and a monovalent organic group represented by formula (III):

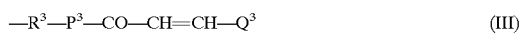

wherein $Q^3$ is a monovalent organic group having an aromatic ring, $P^3$ is a divalent organic group having an aromatic ring, and $R^3$ is a divalent bonding group.

2. The liquid crystal aligning agent of claim 1, wherein $R^2$ and $R^3$ are each a divalent organic group having 6 to 24 carbon atoms and an oxygen atom.

3. The liquid crystal aligning agent of claim 1, wherein the polymer comprises at least one hydrophobic group selected from the group consisting of alkyl group having 10 to 30 carbon atoms, alicyclic skeleton-containing group having 10 to 30 carbon atoms and fluorine-containing organic group having 2 or more carbon atoms in the side chain.

4. The liquid crystal aligning agent of claim 3, wherein the divalent organic group represented by $S^1$ comprises the hydrophobic group.

5. The liquid crystal aligning agent of claim 4, wherein the hydrophobic group is a linear alkyl group having 15 to 20 carbon atoms, cholesteryl group or cholestanyl group.

6. The liquid crystal aligning agent of claim 1, wherein the polymer is prepared by obtaining polyamic acid by polycondensing (1) a tetracarboxylic dianhydride represented by the formula (I-1)

and (2) a diamine compound represented by the formula (I-2)

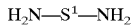 (I-2)

to obtain a polyamic acid, and then reacting the polyamic acid with (3) a halide having a specific group, (4) an alcohol having a specific group or (5) a phenol having a specific group, wherein the specific group is represented by formula (II) or formula (III).

7. The liquid crystal aligning agent of claim 6, wherein the tetracarboxylic dianhydride is at least one selected from the group consisting of 2,3,5-tricarboxycyclopentylacetic dianhydride, butanetetracarboxylic dianhydride, 1,3-dimethyl-1,2,3,4-cyclobutanetetracarboxylic dianhydride, 1,2,3,4-cyclobutanetetracarboxylic dianhydride, pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 5-(2,5-dioxo-tetrahydro-furan-3-yl)-8-octadecyloxy-1,3,3a,4,5,9b-hexahydro-naphtho[1,2-c]furan-1,3-dione, 5-(2,5-dioxo-tetrahydro-furan-3-yl)-8-octadecyl-1,3,3a,4,5,9b-hexahydro-naphtho[1,2-c]furan-1,3dione, 5-(2,5-dioxo-tetrahydro-furan-3yl)-8-trifluoromethyl-1,3,3a,4,5,9b-hexahydro-naphtho[1,2-c]furan-1,3-dione, 5-(2,5-dioxo-tetrahydro-furan-3-yl)-8-triflouromethoxy-1,3,3a,4,5,9b-hexahydro-naphtho[1,2-c]furan-1,3-dione, 5-(2,5-dioxo-tetrahydro-furan-3-yl)-8-nonafluorobutyloxy-1,3,3a,4,5,9b-hexahydro-naphtho[1,2-c]furan-1,3-dione, 5-(2,5-dioxo-tetrahydro-furan-3-yl)-8-(2,2,3,3,4,4,5,5,5-nonafluoro-pentyloxy)-1,3,3a,4,5,9b-hexahydro-naphtho[1,2-c]furan-1,3-dione, 5-(2,5-dioxo-tetrahydro-furan-3-yl)-8-fluoro-1,3,3a,4,5,9b-hexahydro-naphtho[1,2-c]furan-1,3-dione, 5-(2,5-dioxo-tetrahydro-furan-3yl)-5-methyl-8-octadecyloxy-1,3,3a,4,5,9b-hexahydro-naphtho[1,2-c]furan-1,3-dione, 5-(2,5-dioxo-tetrahydro-furan-3yl)-5methyl-8-octadecyl-1,3,3a,4,5,9b-hexahydro-naphtho[1,2c]furan-1,3-dione, 5-(2,5-dioxo-tetrahydro-furan-3yl)-5-methyl-8-trifluoromethyl-1,3,3a4,5,9b-hexahydro-naphtho[1,2c]furan-1,3-dione, 5-(2,5-dioxo-tetrahydro-furan-3-yl)-5-methyl-8-trifluoromethoxy-1,3,3a,4,5,9b-hexahydro-naphtho[1,2c]furan-1,3-dione, 5-(2,5-dioxo-tetrahydro-furan-3-yl)-5-methyl-8-nonafluorobutyloxy-1,3,3a,4,5,9b-hexahydro-naphtho[1,2-c]furan-1,3-dione, 5-(2,5-dioxo-tetrahydro-furan-3-yl)-5-methyl-8-(2,2,3,3,4,4,5,5,5-nonafluoro-pentyloxy)-1,3,3a,4,5,9b-hexahydro-naphtho[1,2-c]furan-1,3-dione, and 5-(2,5-dioxo-tetrahydro-furan-3yl)-8-fluoro-5-methyl-1,3,3a,4,5,9b-hexahydro-naphtho[1,2-c]furan-1,3-dione.

8. The liquid crystal aligning agent of claim 6, wherein the diamine compound is at least one selected from the group consisting of p-phenylenediamine, 4,4'-diaminodiphenylmethane, 1,5-diaminonaphthalene, 2,7-diaminofluorene, 4,4'-diaminodiphenyl ether, 4,4'-(p-phenyleneisopropylidene) bisaniline, 2,2-bis[4-(4-aminophenoxy)phenyl]hexafluoropropane, 2,2-bis(4-aminophenyl)hexafluoropropane, 2,2'-bis[4-(4-amino-2-trifluoromethylphenoxy)phenyl] hexafluoropropane, 4,4'-diamino-2,2'-bis(trifluoromethyl)biphenyl, 4,4'-bis[(4-amino-2-trifluoromethyl)phenoxy]-octafluorobiphenyl, 1-hexadecyloxy-2,4-diaminobenzene, 1-octadecyloxy-2,4-diaminobenzene, 1-cholesteryloxy-2,4-diaminobenzene, 1-cholestanyloxy-2,4-diaminobenzene, hexadecyloxy-(3,5-diaminobenzoyl), octadecyloxy-(3,5-diaminobenzoyl), cholesteryloxy(3,5-diaminobenzoyl) and cholestanyloxy (3,5-diaminobenzoyl).

9. A method of forming a liquid crystal alignment film, comprising applying the liquid crystal aligning agent of claim 1 to a substrate and exposing the coating film to linearly polarized radiation, partially polarized radiation or nonpolarized radiation.

10. The method of claim 9, further comprising heating the substrate wherein said heating is carried out during said exposing step.

11. The method of claim 9, further comprising heating the substrate wherein said heating is carried out after said exposing step.

12. A liquid crystal display element comprising a liquid crystal alignment film which comprises the liquid crystal aligning agent of claim 1.

13. The liquid crystal display element of claim 12 which has a homeotropic alignment mode.

14. The liquid crystal display element of claim 12 which has an in-plane switching mode.

* * * * *